United States Patent [19]
Devito et al.

[11] Patent Number: 5,421,331
[45] Date of Patent: Jun. 6, 1995

[54] AUTOMATIC IDENTIFICATION OF THE LONG AXIS OF THE LEFT VENTRICLE FROM NUCLEAR MEDICINE SPECT DATA FOR USE IN MYOCARDIAL PERUFSION STUDIES

[75] Inventors: Raymond P. Devito, Palatine; Jianzhong Qian, Hoffman Estates, both of Ill.

[73] Assignee: Siemens Medical Systems, Inc., Iselin, N.J.

[21] Appl. No.: 30,928

[22] Filed: Mar. 12, 1993

Related U.S. Application Data

[63] Continuation-in-part of Ser. No. 848,769, Mar. 10, 1992.

[51] Int. Cl.$^6$ ............................................. A61B 6/00
[52] U.S. Cl. ................................... 128/659; 128/653.1; 382/128
[58] Field of Search ...................... 128/653.1, 654, 659; 382/6, 26; 378/20, 62

[56] References Cited
U.S. PATENT DOCUMENTS

| | | | |
|---|---|---|---|
| 4,101,961 | 7/1978 | Reiber | 382/6 |
| 5,150,421 | 9/1992 | Morishita et al. | 382/6 |
| 5,273,040 | 12/1993 | Apicella et al. | 382/6 |

OTHER PUBLICATIONS

The Journal of Nuclear Medicine, vol. 32, No. 9, pp. 1794–1800 (Sep., 1991), Zuo–Xiang He, et al.

Primary Examiner—Lee S. Cohen
Assistant Examiner—Brian L. Casler
Attorney, Agent, or Firm—Mark H. Jay

[57] ABSTRACT

The long axis of the left ventricle is automatically identified by identifying, and correlating, local minima and maxima in images of slices of the left ventricle. Initially, the left ventricle is identified within a representative transverse slice of the left ventricle. The centerline of this slice is automatically computed and used as a reorientation axis, along which another (sagittal) slice of the left ventricle is reconstructed. The centerline of this sagittal slice is automatically computed, and is the long axis of the left ventricle. The accuracy of this identification is confirmed by reconstructing oblique transverse slices of the left ventricle and verifying that their centers are coincident.

2 Claims, 5 Drawing Sheets

AUTOMATIC IDENTIFICATION OF THE LONG AXIS OF THE LEFT VENTRICLE FROM NUCLEAR MEDICINE SPECT DATA FOR USE IN MYOCARDIAL PERUFSION STUDIES

CROSS-REFERENCE TO RELATED APPLICATIONS

The application is a continuation-in-part of commonly-owned application Application Ser. No. 07/848,769, filed Mar. 10, 1992. The entire disclosure of this application, including the drawings, is hereby incorporated herein by reference as if fully set forth.

BACKGROUND OF THE INVENTION

The invention relates to nuclear medicine, and more particularly relates to nuclear medicine studies of the patient's heart. In its most immediate sense, the invention relates to myocardial perfusion studies.

In a SPECT myocardial perfusion study, the diagnostician examines a nuclear medicine image of the patient's myocardium (heart muscle) to see which areas of the muscle take up a radioisotope which is introduced into the patient's bloodstream. If any region of the myocardium does not take up the radioisotope, this means that this region is not perfused by blood and that the tissue in this region is therefore dead. If, on the other hand, the region does take up the radioisotope but not to the same extent as other regions, that region is affected by arteriosclerotic disease.

Myocardial perfusion studies are always carried out on the patient's left ventricle (because of the importance of this muscle in pumping blood through the body). Thus, the object of all myocardial perfusion studies is to identify the precise location of any diseased or dead myocardial tissue of the left ventricle. In order to do this, it is conventional practice to reference the position of a tissue region to the long axis of the left ventricle.

At the present time, such a reference is inherently subjective because identification of the long axis of the patient's left ventricle requires a technician to use judgement. Thus, even studies conducted on the same patient by the same technician may not be exactly comparable with respect to each other. Automation of the process by which the long axis of the left ventricle is identified would therefore improve the diagnostic utility of a myocardial perfusion study.

Furthermore, existing software programs by which a technician identifies the location of the long axis of the left ventricle require that the technician devote substantial time to the identification process. This is disadvantageous and it would be an advantage if the technician could be relieved of this work and thereby freed up to attend to other tasks.

One object of the invention is to provide method and apparatus for automatically identifying the long axis of a patient's left ventricle, thereby increasing the diagnostic utility of a myocardial perfusion study and allowing the technician to perform other tasks.

Another object of the invention is, in general, to improve on known nuclear medicine equipment and methodology.

In accordance with the invention, the method and apparatus disclosed in the above-referenced parent patent application is used to computer-identify a specific organ, namely the myocardium in the patient's left ventricle, on the basis of SPECT projection data acquired during a nuclear medicine study. Then, transverse slices of the left ventricle are reconstructed. From these, a representative transverse slice of the patient's left ventricle is automatically identified. Then, a reorientation plane is computer-established to pass through the projection of the long axis of the representative transverse slice; it is assumed that the long axis of the left ventricle will intersect the identified reorientation plane.

Then, the computer is used to reslice, along the reorientation axis, a perpendicular slice of the patient's left ventricle. From this, the computer automatically determines an axis which is assumed to be the long axis of the patient's left ventricle.

Advantageously, the identification of the long axis of the left ventricle can be checked by reconstructing oblique slices of the patient's left ventricle along the long axis and verifying the coincidence of the centers of such slices.

Use of the invention makes it easier to compare the rest and stress studies. This is because use of the invention produces studies which are consistent and are therefore easier to register with each other.

BRIEF DESCRIPTION OF THE DRAWINGS

The invention will be better understood with reference to the following illustrative and non-limiting drawings, in which.

DETAILED DESCRIPTION OF PREFERRED EMBODIMENTS

A myocardial perfusion study is ordinarily carried out in two phases. Initially, the patient's myocardial blood flow is increased by exercising the patient (e.g. on a treadmill) or by infusing a vasiodialating agent where exercise is contraindicated. When peak cardiac blood flow has been reached, a radiolabeled myocardial perfusion agent is injected into the patient's bloodstream. ASPECT (Single Photon Emission Computed Tomography) study of the patient's heart is then conducted. Later, with the patient in a resting state and with cardiac blood flow at a normal level, a radiolabelled perfusion agent is for the second time injected into the patient's bloodstream. (Alternatively, it is possible to dispense with the second injection and to assume that the originally-injected perfusion agent has completely redistributed itself within the patient's myocardium.) A second SPECT study of the patient's heart is then conducted. A comparison between the nuclear medicine images produced by these two studies permits the physician to determine whether coronary artery disease ("CAD") is present in the patient's heart. If so, the physician can interpret the results to distinguish between regions of ischemia (a treatable condition of the myocardium) or regions of necrosis (which cannot be treated.)

For the purposes of this disclosure, the details of these two studies are unimportant. The present discussion will briefly describe how SPECT data is collected, and will then describe how this data is conventionally used to identify the long axis of the left ventricle. Thereafter, the preferred embodiment of the invention will be described.

Figure 1:
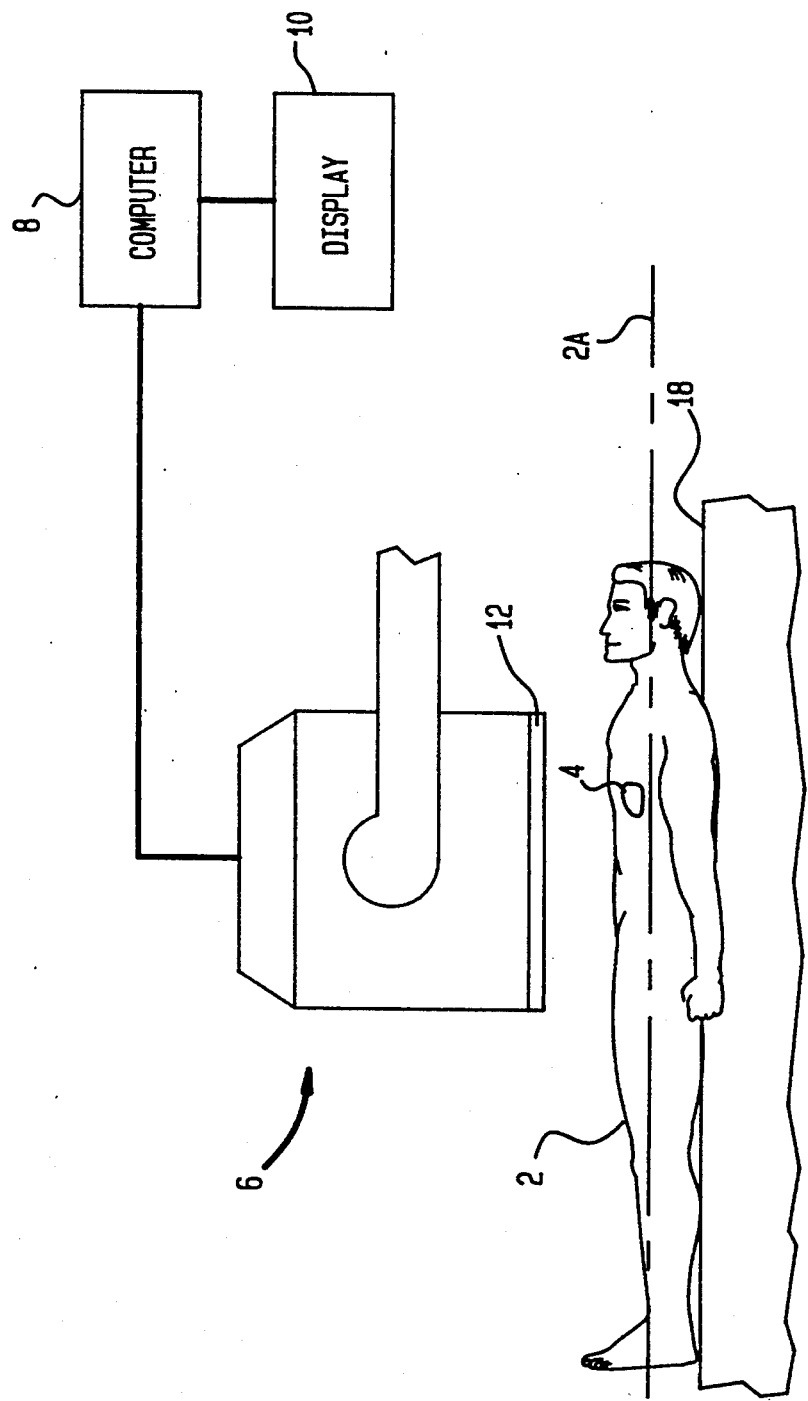
FIG. 1 is an overall schematic diagram of a SPECT scintillation camera system in accordance with the invention.

In a conventional SPECT scintillation camera system such as is shown in FIG. 1, a nuclear medicine SPECT study is conducted upon a patient 2. In such a study, a radioisotope is administered to the patient 2 and a target organ such as the heart 4 of the patient 2 is imaged using a scintillation camera generally indicated by reference numeral 6. During the study, the detector of the camera 6 is rotated around the axis 2A of the body of the patient 2 by a gantry (not shown, other than the arms by which the detector of the camera 6 are supported) so as to acquire a frame of planar image data at each of a plurality of camera stops which are regularly spaced around the body of the patient. The planar image data collected by the camera 6 is routed to a computer 8, and images of the patient 2 may be displayed upon a display 10.

Figure 2:
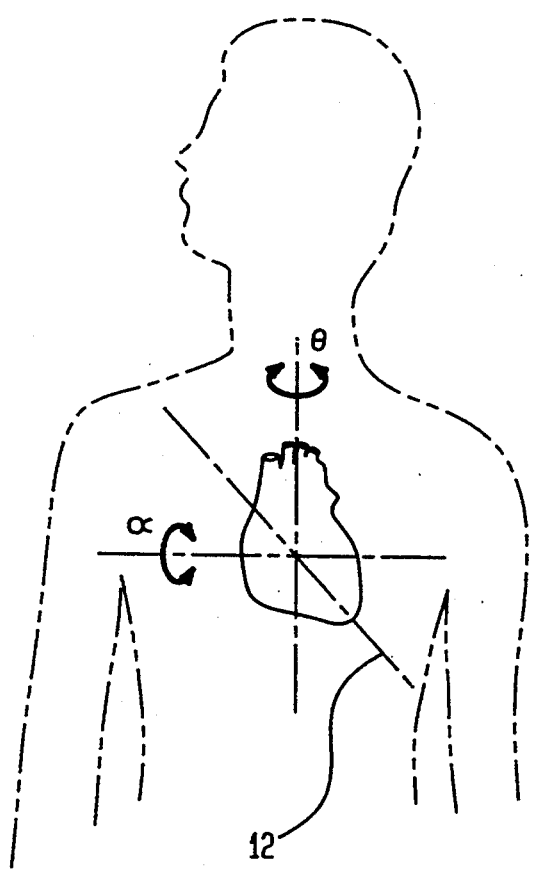
FIG. 2 shows how the anatomy of the heart is oriented with respect to the axis of the body of a patient.

Conventional SPECT reconstruction software is adapted to reconstruct three dimensional images along the axis 2A because that is the natural axis to use when the detector of the camera 6 is rotated around the axis 2A. However, as can be seen in FIG. 2, the ventricle of the patient's heart 2 has a long axis 12 which is at an angle $\Theta$ with respect to the horizontal and at an angle $\alpha$ with respect to the vertical. Consequently, a natural coordinate system for viewing the anatomy of the heart is one where $\Theta$ and $\alpha$ are set equal to 0. In software which is now available for the MicroDELTA and MaxDELTA computers manufactured by Siemens Gammasonics, Inc., assignee of the present application, the technician transforms the projection of the SPECT data so that the acquired SPECT data are viewed from such a natural coordinate system. Such a reorientation of the tomographic data set to produce oblique transverse views of the heart makes it possible to use the already existing and clinically well-tested reconstruction software designed for backprojecting images in the plane of rotation of the camera.

A technician is required to operate the software because the angles $\Theta$ and $\alpha$ are different for each patient and are not known in advance. These angles must be determined each time a study is conducted. To do this, the technician causes images of slices of the left ventricle to be displayed on the display 10 and then manually inputs a first axis (that identifies the plane in which the axis 12 exists) and a second axis (which locates the axis 12 within that plane).

Figure 3:
FIG. 3 shows a typical nuclear medicine image of a transverse slice of a patient's left ventricle.

Thus, the technician causes a transverse slice of the left ventricle to be displayed on the display 10. Such a slice, as is shown in FIG. 3, is generally U-shaped. Then, the technician inputs, as with a mouse or joystick, an assumed reorientation axis 14, which is displayed on the display 10; the reorientation axis 14 is then adjusted as necessary to accurately bisect the left ventricle through the apex. The direction of the reorientation axis 14 establishes angle $\alpha$ and therefore limits the possible location of the axis 12 to somewhere within a plane.

Figure 4:
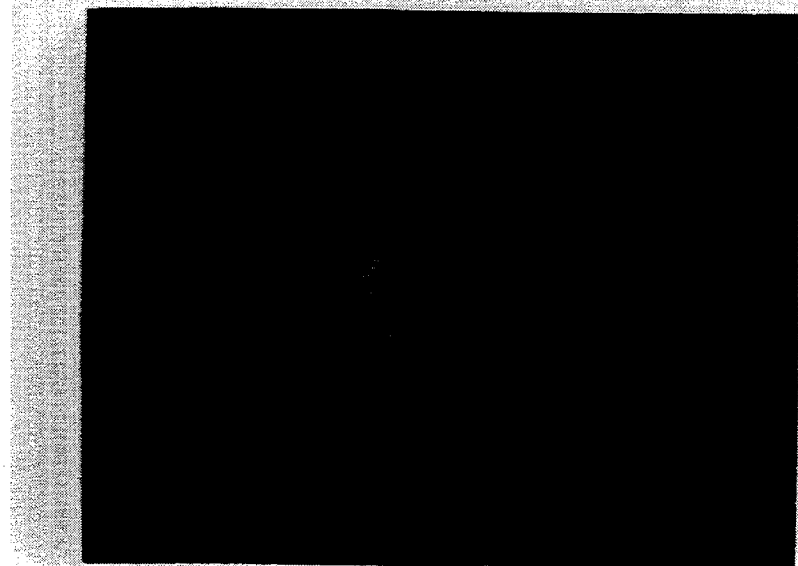
FIG. 4 shows a typical oblique sagittal slice of a patient's left ventricle.

Once the reorientation axis 14 has been inputted, a slice perpendicular to the axis projection and passing through the axis of the left ventricle is reconstructed from the SPECT data along the reorientation axis 14 and displayed on the display 10. This also produces another U-shaped image (see FIG. 4). Once again, the technician inputs, as with a mouse, the assumed axis 12; the assumed axis 12 is then adjusted as necessary to accurately bisect the left ventricle through the apex. This step establishes angle $\Theta$.

At this point, with the knowledge of the angles $\alpha$ and $\Theta$, it is possible for the computer 8 to reorient the heart 4 as described above, and to produce oblique slices of the left ventricle by reslicing the SPECT data along the reoriented axis 12 (which now lies along the axis 2A). (The term "oblique" indicates that the slice is normal to the axis 12, which is oblique to the body axis 2A.) The accuracy of the identification of the axis 12 can be checked by displaying, on the display 10, one such slice after another; if the axis 12 has been properly chosen, the centers of the slices will coincide. If the axis 12 has not been accurately chosen, the centers of the slices of the left ventricular chamber will not coincide and it will be necessary to iterate the above procedures to reach the desired degree of accuracy.

Thus, it may be understood that because subjectivity is involved in inputting the reorientation axis 14 and the assumed axis 12, the results of the technician's work may not be consistent from one study to another. Furthermore, the technician's time is taken up with the tasks of operating the computer 8; this time could more productively be spent doing other tasks.

Figure 5:
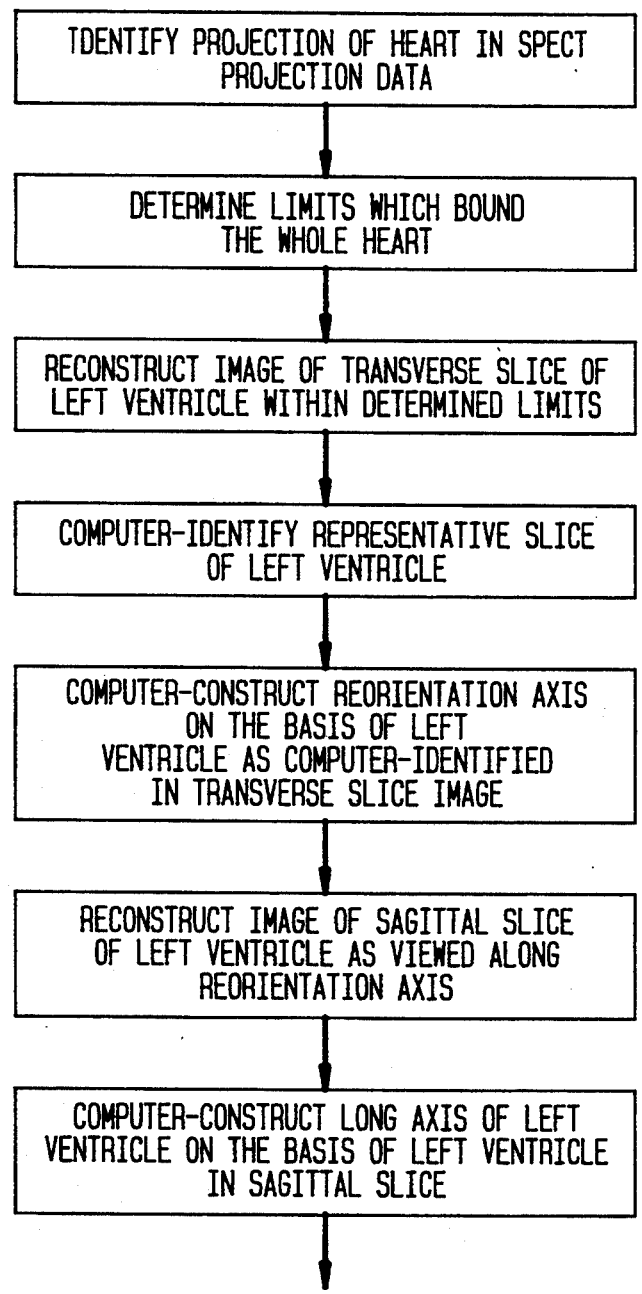
FIG. 5 is a flow chart in accordance with the preferred embodiment of a method in accordance with the invention.

Thus, in accordance with the invention, there is provided method and apparatus for identifying the axis 12 automatically, without the need for input by the technician. This is done by using the method and apparatus disclosed in the above-referenced parent patent application, in accordance with the flow chart illustrated in FIG. 5.

Initially, the computer 8 is used to identify a region of interest in which the whole heart is contained. This is done by applying the methodology and apparatus disclosed in the above-referenced parent patent application to a set of projection SPECT data. Then, based on the height of the thus-identified region of interest, the top and bottom limits of the heart are determined. Only projection data between these top and bottom limits (between which the entire heart is located) are used to reconstruct a set of transverse slices of the left ventricle. (The reconstruction process is known and is not part of the invention.)

From this set of transverse slices of the left ventricle, a representative slice is automatically selected using the computer 8. This selection process is carried out by using the anatomical fact that in each transverse slice, the ventricle is a U-shaped anatomical region. The representative slice is chosen by identifying that slice in which the U-shaped anatomical region has the greatest size; this in turn is done by using the methodology and apparatus disclosed in the above-referenced parent patent application.

Figure 6:
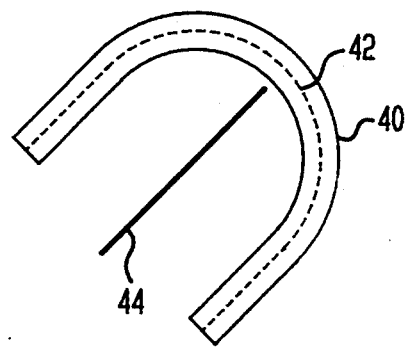
FIGS. 6-10 show how, in accordance with the preferred embodiment of the invention, a reorientation axis is derived from a representative transverse slice of a patient's left ventricle.

Once the representative slice has been identified, the computer 8 is then used (as per the disclosure of the above-referenced parent patent application) to identify, and to construct line segments from, local maxima and local minima in the image of the representative slice. This is shown in FIG. 6. Because the left ventricular myocardium 40 takes up the radioisotope, the line segments of local maxima 42 correspond to the outline of the left ventricular myocardium. Because there is no uptake of radioisotope in the central chamber of the left ventricle, the line segments of local minima correspond to a line 44 which is parallel to the centerline of the left ventricular myocardium. It is therefore possible to computer-identify the outline of the left ventricular myocardium and a line which is parallel to the centerline of the left ventricular myocardium from the data in the representative transverse slice of the left ventricle.

Figure 7:
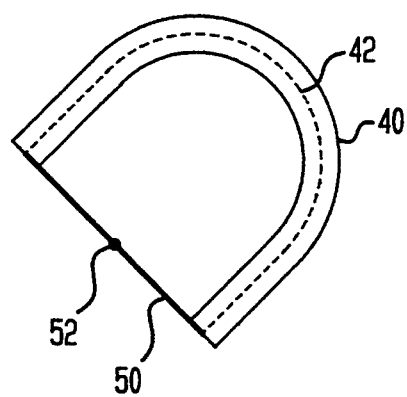

It is an anatomical fact that the axis 12 passes through the centerline of the left ventricular myocardium 40. In the preferred embodiment, this centerline is located automatically using the following procedure:

(1) The two endpoints of the line segments of local maxima 42 are connected together by a straight line segment 50 and the centerpoint 52 of the straight line segment 50 is determined. (FIG. 7)

Figure 8:
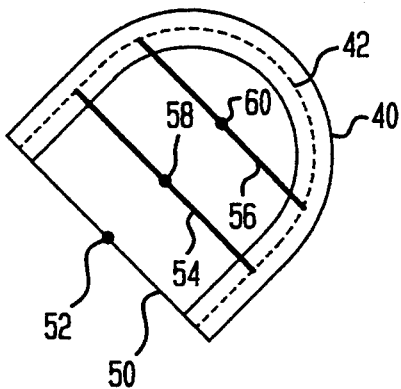

(2) A set of at least two straight lines (here, two straight lines 54 and 56 are shown) is constructed to be parallel to the line segment 50 and to intersect both sides of the line segments of local maxima 42. The corresponding centerpoints 58 and 60 are determined. (FIG. 8)

Figure 9:
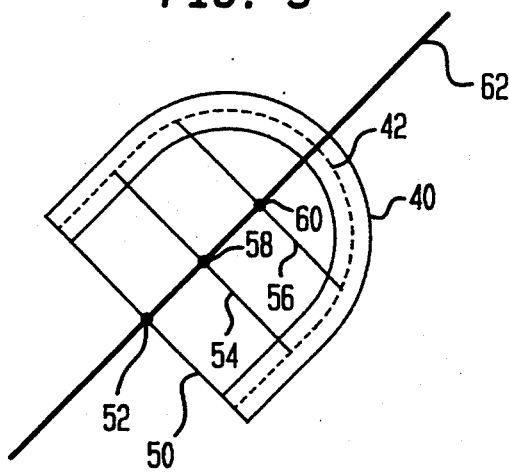

(3) A straight line 62 is best-fitted to the centerpoints 52, 58 and 60. (FIG. 9)

Figure 10:
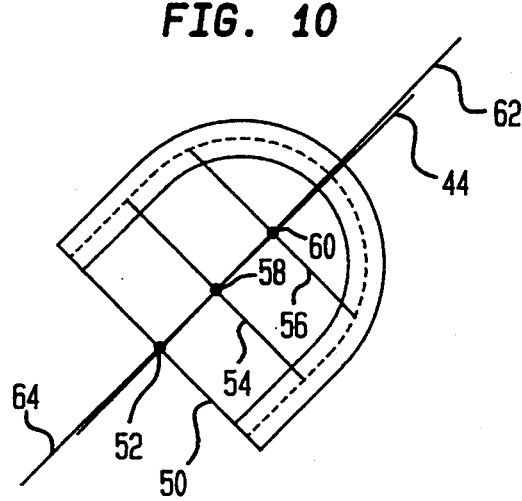

(4) The centerline 64 of the slice of the left ventricular myocardium 40 is determined by combining information from both the best-fitted straight line 62 and the identified line 44. (FIG. 10) This in turn is carried out as follows:

(a) It is assumed that an extension of the line 44 intersects the line segments 42 of local maxima at the "apex" of the curve. If the best-fitted straight line 62 intersects the line segments 42 at or very near the same "apex" point, the centerline 64 is taken to be the best-fitted straight line 62.

(b) If the best-fitted straight line 62 does not intersect the line segments 42 at or very near the same "apex" point, the best-fitted straight line 62 is recomputed, subject to the additional constraint that the best-fitted straight line 62 is required to pass through the same "apex" point.

The local maxima in the slice, and the local maxima line segments 40 which delineate the left ventricular myocardium 40 within the slice, do not depend upon the absolute values of local activities (i.e. do not depend upon the absolute quantity of radioisotope taken up by the myocardium or the duration of the study.) They rather depend upon the relative values of local activities. Thus, even if the slice encompasses regions of necrosis (necrotic tissue does not take up the radioisotope and therefore shows no activity, thereby causing gaps to show up in the line segments of local maxima) the line segments of local maxima 40 in these necrotic regions still can be identified as long as the local activities adjacent these regions are not completely flat. Where small gaps (on the order of a few pixels) exist in the line segments, they can be easily filled in by conventional curve-fitting algorithms.

It is an anatomical fact that the axis 12 lies in a plane which includes the thus-determined centerline and which is perpendicular to the transverse slice. It is consequently necessary to locate the axis 12 within that plane. Another image (this time, an image of a sagittal slice through the left ventricle) is resliced from the reconstructed SPECT data, along the determined plane. Thus, another U-shaped slice of the left ventricular myocardium is obtained, but this time the slice is a sagittal slice and not a transverse slice, and the sagittal slice so determined is known to contain the axis 12.

To determine the centerline of the new U-shaped left ventricular myocardium slice, the above-described steps are repeated, but on different data. Briefly:

The computer 8 is once again used to identify local extrema and line segments which contain such extrema. Line segments of local maxima are taken to indicate the outline of the left ventricular myocardium, and line segments of local minima may approximately lie along the axis 12. Then, the endpoints of the line segment of local maxima are connected together by a straight line segment, and the centerpoint of that line segment is identified. At least two line segments are constructed such as to be parallel to the straight line segments and to intersect the line segments of local maxima. The centerpoints of these other line segments are identified, a straight line segment is best-fitted to the centerpoints, and the axis 12 is located by combining the information from the line segment of local minima with the information from the best-fitted straight line segment. This combination, as stated above, insures that the axis 12 passes through the "apex" of the curve.

At this point, the identified centerline is the long axis 12 of the left ventricle, as viewed obliquely. The reconstructed SPECT data can be resliced perpendicularly to the long axis 12 to produce slices of the left ventricular myocardium.

Although a preferred embodiment has been described above, the scope of the invention is limited only by the following claims:

We claim:

1. Apparatus for automatically identifying the long axis of the left ventricle from SPECT data acquired during a nuclear medicine study of a patient's heart, comprising:

computer means for reconstructing and selecting, from said SPECT data and without additional input from a human technician, a single slice of the left ventricle, which single slice is assumed to be a representative transverse slice of the left ventricle;

computer means for defining, without additional input from a human technician, a reorientation axis which passes through the center of said single slice and is assumed to be intersected by the long axis of the left ventricle;

computer means for reconstructing, without additional input from a human technician, and from said SPECT data and along said reorientation axis, a sagittal slice of the left ventricle; and computer means for defining, without additional input from a human technician, an axis which passes through the center of said sagittal slice and is assumed to be the long axis of the left ventricle.

2. Scintillation camera apparatus for performing a myocardial perfusion study of a patient's heart, comprising:

means, including a scintillation camera detector and a gantry supporting said detector, for acquiring SPECT data from the patient's myocardium;

means for reconstructing and selecting, from said SPECT data alone and without additional human input, a single slice of the left ventricle, which single slice is assumed to be a representative transverse slice of the left ventricle;

means for defining, without additional human input, a reorientation axis which passes through the center of said single slice and is assumed to be intersected by the long axis of the left ventricle;

means for reconstructing, from said SPECT data and along said reorientation axis and without additional human input, a sagittal slice of the left ventricle;

means for defining, without additional human input, an axis which passes through the center of said sagittal slice and is assumed to be the long axis of the left ventricle; and means for displaying images reconstructed from said SPECT data.

* * * * *